United States Patent
Mosayyebpour Kaskari et al.

(10) Patent No.: US 11,328,733 B2
(45) Date of Patent: May 10, 2022

(54) GENERALIZED NEGATIVE LOG-LIKELIHOOD LOSS FOR SPEAKER VERIFICATION

(71) Applicant: SYNAPTICS INCORPORATED, San Jose, CA (US)

(72) Inventors: Saeed Mosayyebpour Kaskari, Irvine, CA (US); Atabak Pouya, Irvine, CA (US)

(73) Assignee: SYNAPTICS INCORPORATED, San Jose, CA (US)

(*) Notice: Subject to any disclaimer, the term of this patent is extended or adjusted under 35 U.S.C. 154(b) by 34 days.

(21) Appl. No.: 17/031,755

(22) Filed: Sep. 24, 2020

(65) Prior Publication Data

US 2022/0093106 A1  Mar. 24, 2022

(51) Int. Cl.
| | | |
|---|---|---|
| G10L 15/00 | (2013.01) | |
| G10L 15/16 | (2006.01) | |
| G10L 17/04 | (2013.01) | |
| G10L 15/02 | (2006.01) | |
| G10L 17/18 | (2013.01) | |

(52) U.S. Cl.
CPC .............. *G10L 17/04* (2013.01); *G10L 15/02* (2013.01); *G10L 17/18* (2013.01)

(58) Field of Classification Search
CPC .......... G10L 15/02; G10L 17/04; G10L 17/18
USPC ....................................................... 704/232
See application file for complete search history.

(56) References Cited

U.S. PATENT DOCUMENTS

| | | | |
|---|---|---|---|
| 6,567,776 B1* | 5/2003 | Chang | G10L 15/063 704/236 |
| 6,618,702 B1* | 9/2003 | Kohler | G10L 15/02 704/250 |
| 7,318,032 B1* | 1/2008 | Chaudhari | G10L 17/08 704/231 |
| 9,704,488 B2* | 7/2017 | Kashtan | G10L 17/04 |
| 10,586,541 B2* | 3/2020 | Kashtan | H04M 3/569 |
| 10,706,840 B2* | 7/2020 | Sak | G06N 3/02 |
| 10,964,330 B2* | 3/2021 | Nassar | G10L 17/06 |
| 2010/0268537 A1* | 10/2010 | Al-Telmissani | G10L 17/04 704/246 |
| 2019/0057683 A1* | 2/2019 | Sak | G10L 15/22 |
| 2019/0355347 A1* | 11/2019 | Arik | G06N 20/20 |
| 2020/0342857 A1* | 10/2020 | Moreno | G10L 15/30 |
| 2020/0365160 A1* | 11/2020 | Nassar | G10L 25/78 |
| 2021/0098134 A1* | 4/2021 | Zhang | G16H 50/30 |

(Continued)

*Primary Examiner* — Khai N. Nguyen
(74) *Attorney, Agent, or Firm* — Paradice & Li LLP

(57) ABSTRACT

Systems and methods for speaker verification comprise optimizing a neural network by minimizing a generalized negative log likelihood function, including receiving a training batch of audio samples comprising a plurality of utterances for each of a plurality of speakers, extracting features from the audio samples to generate a batch of features, processing the batch of features using a neural network to generate a plurality of embedding vectors configured to differentiate audio samples by speaker, computing a generalized negative log-likelihood loss (GNLL) value for the training batch based, at least in part, on the embedding vectors, and modifying weights of the neural network to reduce the GNLL value. Computing the GNLL may include generating a centroid vector for each of a plurality of speakers, based at least in part on the embedding vectors.

20 Claims, 7 Drawing Sheets

(56) References Cited

U.S. PATENT DOCUMENTS

2021/0117760 A1\* 4/2021 Krishnan .............. G06K 9/6256
2021/0182258 A1\* 6/2021 Dash .................... G06K 9/6267

\* cited by examiner

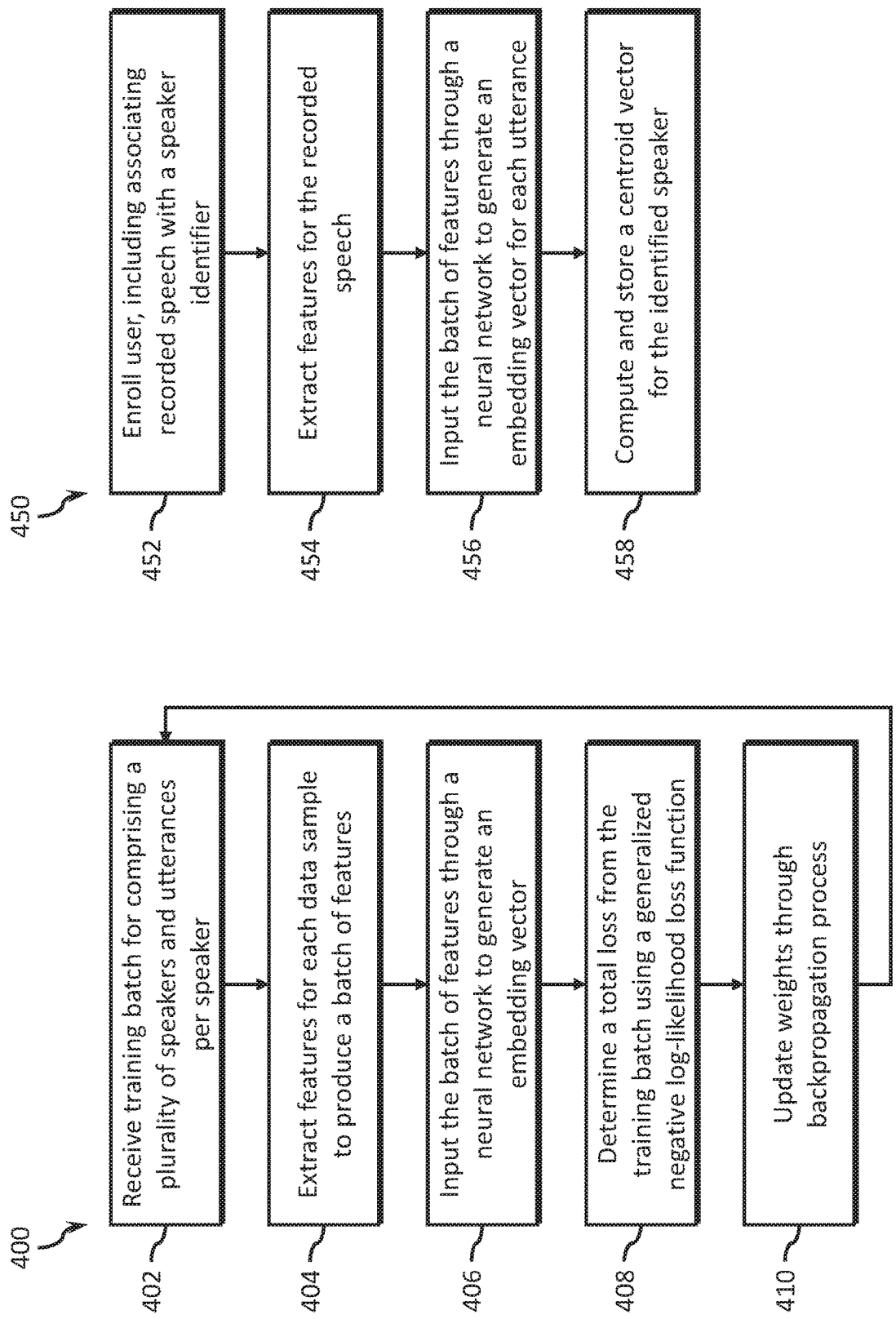

GENERALIZED NEGATIVE LOG-LIKELIHOOD LOSS FOR SPEAKER VERIFICATION

TECHNICAL FIELD

The present application, in accordance with one or more embodiments, relates generally to audio signal processing and, more particularly, for example, to systems and methods for training and/or implementing audio analysis systems for speaker verification.

BACKGROUND

Biometric authentication is used in a variety of electronic systems for tasks such as authenticating user and account information in a payment transaction, limiting access to a personal electronics device, and controlling access to one or more physical locations. Advances in biometrics have allowed for increased adoption of biometric authentication in personal devices (e.g., mobile phones, wearables, smart speakers) using technologies such as fingerprint identification, facial recognition, iris scanning, and voice recognition. However, factors such as hardware and processing limitations and the wide variety of use cases and environments in which these devices may be used can make secure and reliable biometric authentication challenging.

With the proliferation of voice interaction devices such as smart speakers and the popularity of hands-free voice-controlled applications, the demand for voice authentication is increasing. Compared with other biometrics technologies such as fingerprint matching or iris scanning, voice biometric authentication systems have relatively high false acceptance rates (FAR) and false rejection rates (FRR). The voice interaction devices may be used in a variety of environments that further reduce the reliability and security of voice biometric authentication. In a controlled, quiet environment, the reliability of voice biometrics may reach an acceptable level, but the reliability drops when the voice-controlled device is operated in a noisy environment. Solutions that add costly hardware or hinder the user experience of a hands-free, voice-controlled application are not desirable in many scenarios. As a result, voice authentication remains challenging when used with mobile devices, in noisy environments and/or with applications requiring a high level of security and reliability.

In view of the forgoing, there is a continued need in the art for improved voice biometrics systems and methods that are secure and reliable when used in a variety of devices, applications and environments.

SUMMARY

The present disclosure is directed to systems and methods for speaker verification, including improved training systems and methods that incorporate a generalized negative log likelihood loss (GNLL) function. In various embodiments, the GNLL function is used in an efficient training process to improve the training of speaker verification models over conventional approaches. The disclosed embodiments can be used to improve the performance of text dependent or text independent voice biometric solutions, and also be applied for face identification and other biometric modalities to improve robustness. The present disclosure provides a robust solution that is suitable for a variety of devices such as tablets, mobile phones, laptop computers, etc., providing voice biometrics with improved robustness against noise and improved FAR and FRR performance in real environments.

In various embodiments, a method includes receiving a training batch of audio samples comprising a plurality of utterances for each of a plurality of speakers (e.g., a first number of speakers and a second number of utterances per speaker), extracting features from the audio samples to generate a batch of features, processing the batch of features using a neural network to generate a plurality of embedding vectors configured to differentiate audio samples by speaker, computing a generalized negative log-likelihood loss (GNLL) value for the training batch based, at least in part, on the embedding vectors, and modifying weights of the neural network to reduce the GNLL value. Computing the GNLL may include generating a centroid vector for each of a plurality of speakers, based at least in part on the embedding vectors. Modifying weights of the neural network to reduce GNLL value may include optimizing the neural network using backpropagation.

The method may further comprise an enrollment process comprising receiving an enrollment audio signal comprising speech associated with a known user, identifying speech segments in the enrollment audio signal, extracting user features from the speech segments, inputting the extracted user features to the neural network to generate a plurality of user embedding vectors, and storing a centroid vector computed from the user embedding vectors and a user identifier.

The method may further comprise a speaker authentication process comprising receiving a target audio signal comprising speech from a target speaker, extracting target features from the target audio signal, processing the target features through the neural network to generate at least one target embedding vector, and determining whether the target speaker is associated with a user identifier by comparing the target embedding vector with a stored centroid vector associated with the user identifier. In some embodiments, determining whether the target speaker is associated with a user identifier comprises calculating a confidence score measuring a similarity between the target embedding vector and the stored centroid vector. Calculating a confidence score may include computing an inner product of a target embedding vector and the centroid vector and applying a sigmoid function. In some embodiments, determining whether the target speaker is associated with a user identifier further includes storing a plurality of user identifiers and corresponding centroid vectors, wherein each of the plurality of user identifiers is associated with a different speaker, and calculating a confidence score for each of the plurality of user identifiers, based in part on a likelihood that the target embedding vector is from the same speaker as the corresponding centroid vector.

In various embodiments, the method further includes incorporating an additional margin into the embedding vectors, the additional margin configured to separate embedding of speaker classes in the embedding vectors. The embedding vectors may be unit vectors.

In some embodiments, a system includes a logic device configured to train a neural network using a generalized negative log-likelihood loss (GNLL) function, the logic device configured to execute logic comprising receiving a training batch of audio samples comprising a plurality of utterances for each of a plurality of speakers (e.g., a first number of speakers and a second number of audio samples per speaker), extracting features from the audio samples to generate a batch of features, processing the batch of features using a neural network to generate embedding vectors configured to differentiate audio samples by speaker, computing a generalized negative log-likelihood loss (GNLL) value for the training batch based, at least in part, on the embedding vectors, and modifying weights of the neural network to reduce the GNLL value. Computing the GNLL may further include generating a centroid vector for each of a plurality of speakers, based at least in part on the embedding vectors. In some embodiments, modifying weights of the neural network to reduce GNLL value comprises optimizing the neural network using backpropagation.

In some embodiments, a system includes a storage component, and a logic device configured to verify an identity of a speaker by executing logic comprising performing an enrollment process. The enrollment process may include receiving an enrollment audio signal comprising speech associated with a known user, identifying speech segments in the enrollment audio signal, extracting user features from the speech segments, processing the extracted user features through a neural network, to generate a plurality of user embedding vectors, and storing a centroid vector computed from the user embedding vectors and a user identifier.

In some embodiments, the logic device is further configured to execute logic comprising performing a speaker authentication process including receiving a target audio signal comprising speech from a target speaker, extracting target features from the target audio signal, processing the target features through the neural network to generate at least one target embedding vector, and determining whether the target speaker is associated with a user identifier by comparing the target embedding vector with a stored centroid vector associated with the user identifier. In some embodiments, determining whether the target speaker is associated with a user identifier includes calculating a confidence score measuring a similarity between the target embedding vector and the stored centroid vector by computing an inner product of a target embedding vector and the centroid vector and applying a sigmoid function. In some embodiments, determining whether the target speaker is associated with a user identifier further includes storing a plurality of user identifiers and corresponding centroid vectors, wherein each of the plurality of user identifiers is associated with a unique speaker, and calculating a confidence score for each of the plurality of user identifiers, based in part on a likelihood that the target embedding vector is from the same speaker as the corresponding centroid vector.

The scope of the present disclosure is defined by the claims, which are incorporated into this section by reference. A more complete understanding of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, where showings therein are for purposes of illustrating embodiments of the present disclosure and not for purposes of limiting the same. The components in the drawings are not necessarily to scale, emphasis instead being placed upon clearly illustrating the principles of the present disclosure.

FIG. 4A illustrates an example training process for a speaker verification system, in accordance with one or more embodiments of the present disclosure.

FIG. 4B illustrates an example speaker enrollment process, in accordance with one or more embodiments of the present disclosure.

DETAILED DESCRIPTION

The present disclosure is directed to systems and methods for speaker verification, including improved training systems and methods that incorporate a generalized negative log likelihood loss (GNLL) function. Speaker verification (SV) typically includes the process of verifying whether an utterance belongs to a specific person, based on that speaker's known utterances (e.g., login or enrollment utterances). Two types of speaker verification are text dependent speaker verification and text independent speaker verification. Text dependent speaker verification requires the speaker to vocalize a specific phrase which is then compared to a previous vocalization of the phrase recorded during an enrollment process. Text independent speaker verification includes identifying a speaker's voiceprint through a process that does not rely on a previously recorded utterance by the speaker of a specific phrase.

In various embodiments, a GNLL function is used in an efficient training process to improve the training of speaker verification models over conventional approaches. GNLL training is based on processing a plurality of utterances in one batch of data which may include N different speakers, and M samples of utterances per speaker. The loss is averaged over all of the utterances in a batch. The disclosed embodiments can be used to improve the performance of text dependent or text independent voice biometric solutions, for face identification and other biometric solutions to improve robustness. A neural network trained using GNLL may be implemented on a variety of devices such as tablets, mobile phones, laptop computers, etc., for use with voice biometrics to improve its robustness against noise and improve the FA/FRR performance in real environments.

Figure 1:
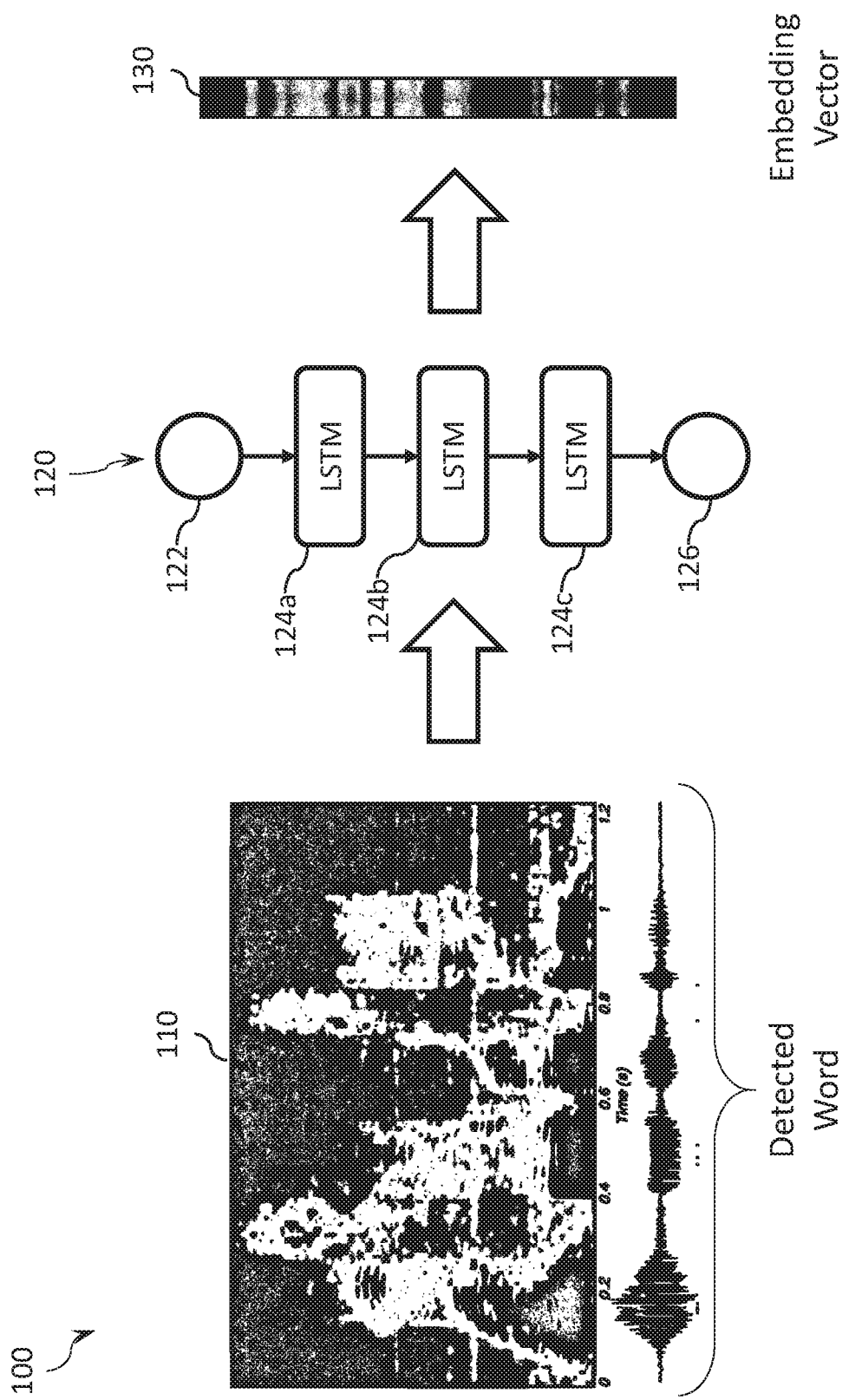
FIG. 1 illustrates an example neural network process for generating an embedding vector, in accordance with one or more embodiments of the present disclosure.

Referring to FIG. 1, an example neural network process will now be described, in accordance with one or more embodiments. A process 100 includes receiving an audio input sample 110, representing a detected keyword uttered by a speaker. In some embodiments, the system includes one or more microphones sensing sound and converting the sound to electrical signals. The received audio signal is processed through audio input circuitry and one or more digital audio processing systems, which may include a voice activity detector (VAD) configured to identify speech segments in the received audio signal, noise reduction, echo cancellation, dereverberation, spatial processing, and/or other audio processing. In some embodiments, the digital audio processing system further identifies a keyword or phrase before processing the audio input sample 110 for input to the process 100.

The audio input sample 110 is fed to a neural network 120. In various embodiments, the input speech samples are derived from an audio signal in fixed length frames that are preprocessed for feature extraction (e.g., passing the audio signal through finite impulse response filter, partitioning the audio signal into frames, applying echo and noise cancellation/suppression, etc.), before input to the neural network 120.

The neural network 120 may include a long short-term memory (LSTM) network including an input layer 122, LSTM hidden layers (e.g., LSTM layers 124a, 124b, and 124c), and an output layer 126. The neural network 120 is an example of a neural network that may be used with improvements disclosed herein, and other types of neural networks and configurations can be used, such as a convolutional neural network (CNN), an attention-based network, a network configured with a different number of hidden layers, etc. The output of the neural network 120 for the audio input sample 110 is an embedding vector 130 which can represent the input data in D-dimensional space (e.g., a fixed length of D=128). The embedding vector ($e_k$) represents a fixed length of the $k^{th}$ sample of input data.

Figure 2:
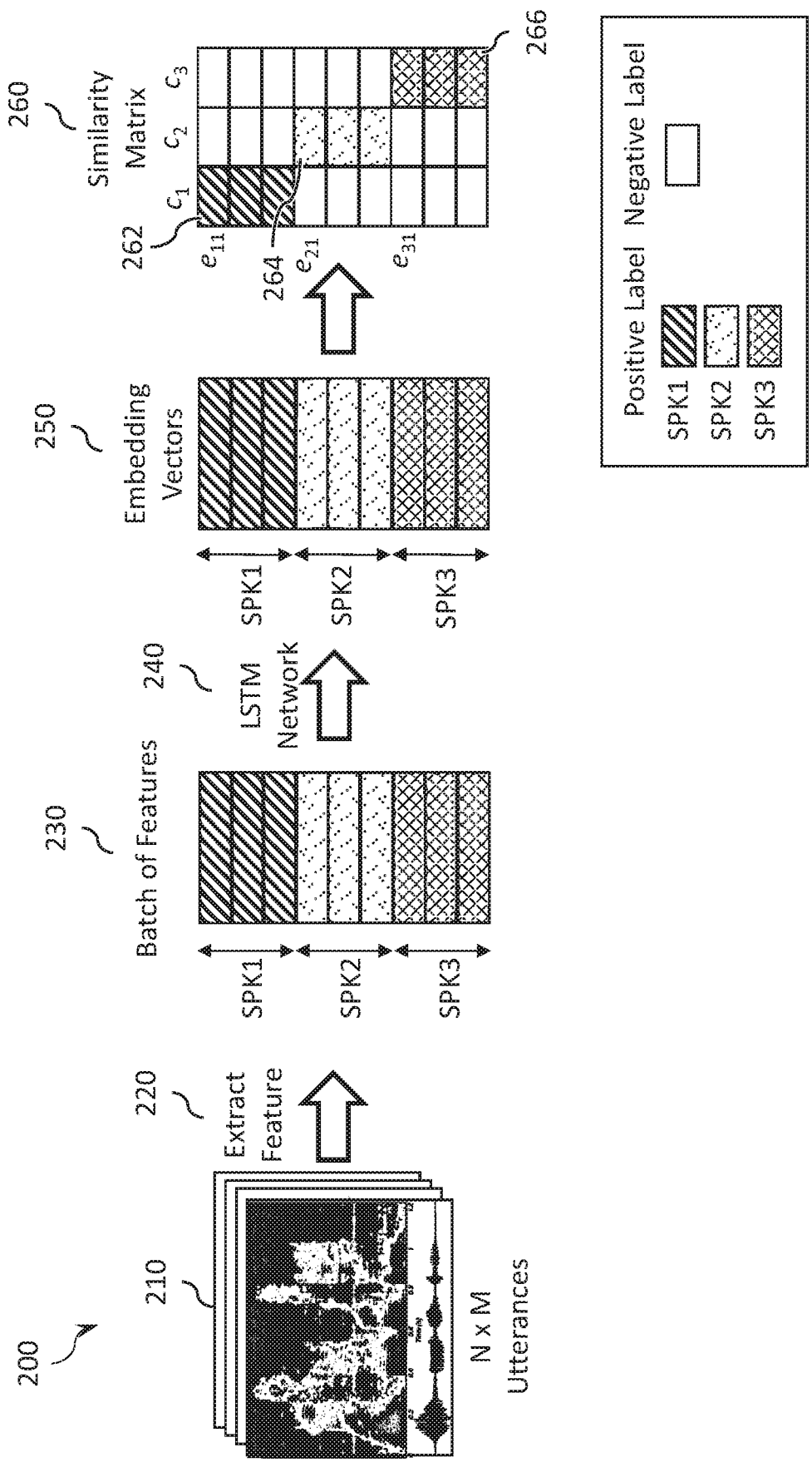
FIG. 2 illustrates an example speaker verification process, in accordance with one or more embodiments of the present disclosure.

Referring to FIG. 2, a training process will be discussed in further detail, in accordance with one or more embodiments. The process 200 receives an input batch 210 of training data as a series audio samples comprising data utterances, which is run through a feature extraction process 220 to generate a batch of features 230 for speaker identification. The input batch 210 has N×M utterances, where N is a number of speakers and M is a number of utterances per speaker. The input batch 210 is used to extract the batch of features 230 for each of the speakers (e.g., SPK1, SPK2, and SPK3). In some systems, the batch may be populated with recorded utterances from known speakers in clean and/or target environments, synthetically generated audio samples, and/or other audio training data.

In various embodiments, the extracted features may include features derived through one or more of modified group delay functions, spectral slope-based analysis, short-time Fourier transform analysis, cepstral analysis, complex cepstral analysis, linear prediction coefficients, linear prediction cepstrum coefficients, linear prediction cepstral coefficients, Mel frequency cepstral coefficients, discrete wavelet transform, perceptual linear prediction, Mel-scaled discrete wavelet analysis, and/or other audio feature analyses capable of generating features from audio input data to differentiate between a plurality of speakers. Other audio feature extraction approaches may also be used in various embodiments (e.g., features related to speech recognition, noise, music, etc.) to extract additional information from the audio sample as relevant to a particular implementation.

In the illustrated embodiment, each batch of data or features has N=3 speakers and each speaker has M=3 samples (e.g., 3 samples of each speaker identified in FIG. 2). This batch of features 230 is fed to a neural network 240 (e.g., an LSTM network) in order to obtain the embedding vectors 250 for each data sample. The embedding vector of $i^{th}$ sample of $j^{th}$ speaker is denoted by $e_{ji}$. The embedding vectors ($e_{ji}$) and computed centroid vectors for each class ($c_k$) (e.g., represented by a similarity matrix 260) are used to compute a confidence score and/or similarity metric for the input batch of data. As illustrated, each class $c_k$ represents a corresponding speaker, such as the embedding vectors 262 in class $c_1$, embedding vectors 264 in class $c_2$, and embedding vectors 266 in class $c_3$. In some embodiments, the centroid of each speaker $SPK_n$ is obtained by averaging the embedding vectors, and it is assumed that the embedding vector of each sample has a unit norm. It will be appreciated that, in other embodiments, a different number of speaker and/or samples may be used, and the centroid of each speaker may be obtained using other known statistical methods.

The centroid vectors are stored in a memory or database for each speaker id, and then the similarity between any new sample of any speaker versus the centroid is computed. In one embodiment, the confidence score is calculated by using the inner product of the vectors followed by sigmoid function ($\sigma(\cdot)$). A confidence score ($p_{ji,k}$) is calculated to determine whether the $i^{th}$ sample of $j^{th}$ speaker belongs to the $k^{th}$ speaker as follows:

$$\text{centroid} \rightarrow c_k = \frac{1}{M} \sum_{i=1}^{M} e_{ki}, k = 1, \ldots, N$$

$$\text{Confidence Score} \rightarrow p_{ji,k} = \begin{cases} \sigma(w(e_{ji} \cdot c_k) + b), & k = j \\ \sigma(w(e_{ji} \cdot c_k) + b + b_0(1 - e^{-\alpha\tau})), & k \neq j \end{cases}$$

The value w (weight) and b (bias) are scalars that may be learned during the training. The notation (·) denotes the dot product of two vectors. The values $b_0$ and $\alpha$ are fixed hyperparameter values and are not learned during training. The value $\tau$ is the epoch or iteration number.

The confidence score for computing the similarity for inter classes has an additional term $b_0(1-e^{-\alpha\tau})$ in comparison with the score for intra classes. This is an additional margin that is introduced to force the embedding of inter classes to be far from each other at least with this $b_0(1-e^{-\alpha\tau})$ margin. Also, the margin will be exponentially increased up to a final value ($b_0$).

Figure 3B:
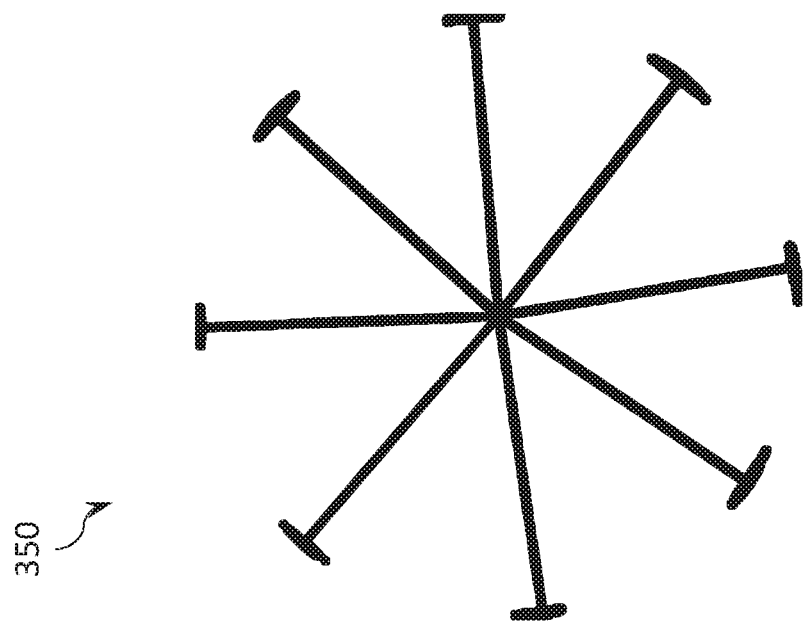
FIGS. 3A and 3B are example plots illustrating embedding vectors with and without additional margin, in accordance with one or more embodiments of the present disclosure.
Figure 3A:
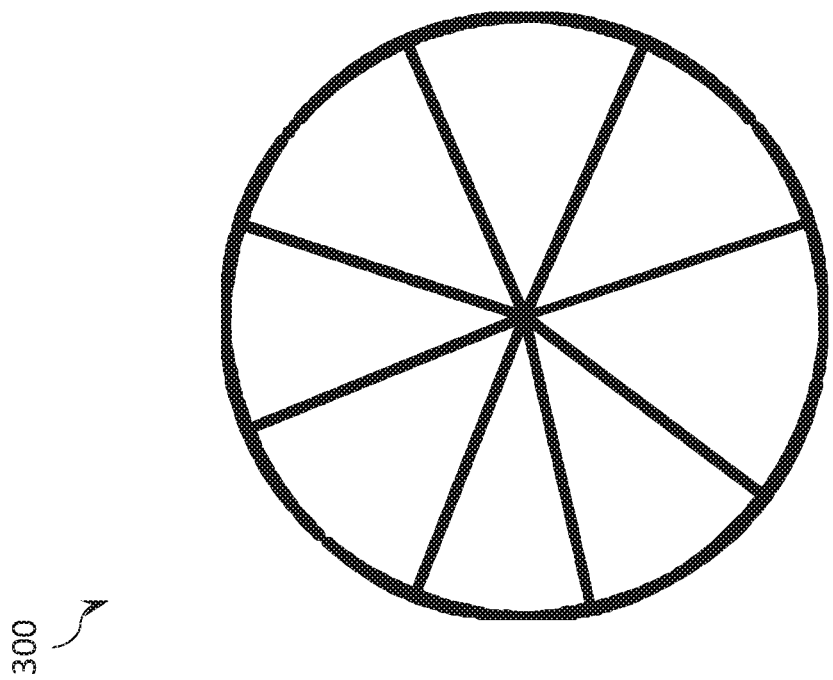

As illustrated in FIGS. 3A and 3B, the effect of adding this additional margin for inter classes will result in embedding vectors 350 in arc space (because the embedding vectors are assumed to be unit norm) with extra margin. The plot on the left shows the embedding vectors 300 when the additional margin is not added as compared to the plot on the right which shows the embedding vectors 350 when the additional margin is added as indicated in the confidence score equation. In other words, the geodesic distance gap between closest classes becomes evident as the additional margin $b_0(1-e^{-\alpha\tau})$ is incorporated in the confidence score equation.

In practice in order to compute $p_{ji,j}$, the centroid $c_j$ will be recomputed using all the samples of $j^{th}$ speaker except the $i^{th}$ sample. The total loss ($L_{total}$) for each batch of data is then computed as follows:

$$L_{GNLL} = \frac{-1}{N*M} \sum_{j=1}^{N} \sum_{i=1}^{M} \log p_{ji,j} + \log(1 - \max_{1 \leq k \leq N, k \neq j}(p_{ji,k}))$$

$$L_{Norm} = \frac{\sum_{j=1}^{N} \sum_{i=1}^{M} (|e_{ji}|_2 - r)^2}{\sum_{j=1}^{N} \sum_{i=1}^{M} (|e_{ji}|_2)^2}$$

-continued $$L_{total} = L_{GNLL} + \gamma L_{Norm}$$

where γ and r are two hyper parameters are tuned during the training.

After training, the centroid of each speaker is stored for speaker identification. The confidence score of each new sample from any speaker will be computed using the centroid and the embedding vectors and the score will be compared with a predefined threshold to decide whether the speaker belongs to a specific user ID or not. The performance of the proposed system can be further improved by introducing another probabilistic classifier such as Probabilistic Linear Discriminant Analysis (PLDA) classifier that will be applied to the learned embedding vectors.

The proposed system is targeted to be used for voice ID solution in which the voice of speakers is used to verify the identity of the speaker. This system can be used for both text dependent and text independent voice ID. The proposed system can be used to verify the ID of a speaker when the speaker is requested to pronounce a specific keyword (in text dependent voice ID) or he is asked to talk any passphrase or speech content and the ID will be verified. Also, the proposed solution can be used to improve other authentication problems such as face ID or other biometric identification. Similar to voice ID, a few photos of a person's face will be used for enrollment and then the ID of the user will be verified using his face.

Referring to FIG. 4A, an example process for training a neural network for speaker identification will be described, in accordance with one or more embodiments of the present disclosure. The example training process 400 uses a generalized negative log-likelihood loss approach for training a neural network for speaker verification as previously discussed. In step 402, a training system receives a batch of training data comprising a plurality of utterances from a plurality of speakers (e.g., N speakers and M utterances per speaker). In step 404, the training system extracts features from each data sample in the training batch to produce a batch of features. In step 406, the batch of training features is input to a neural network to generate an embedding vector for each sample. In step 408, a total loss from the training batch is calculated for each speaker using a generalized negative log-likelihood loss function. In step 410, the weights of the neural network are adjusted through a back-propagation process to minimize the computed loss (e.g., by computing the gradient of the loss function with respect to the weights). The training process 400, then continues with the next training batch.

After training, the neural network may be used for speaker identification. Referring to FIG. 4B, an example speaker enrollment process 450 will be described, in accordance with one or more embodiments. The speaker enrollment process 450 starts with an enrollment process 452 for a system and/or device. In some embodiments, a user device is configured with at least one microphone, storage components for storing user data and a trained neural network for speaker identification, and a computing system configured to execute the steps of the speaker enrollment process 450. The enrollment process records speech from a known user, who may be identified to the system using a speaker ID. In step 454, the system extract features from recorded speech segments. This process may include voice identification, speech processing to identify one or more utterances, framing, and/or other steps to prepare the recorded audio for input to the trained neural network. In step 456, the features are input to the trained neural network to generate an embedding vector for each utterance. In step 458, a centroid of the speaker is computed and stored along with a speaker identifier. The system may now be used for speaker identification.

Figure 4C:
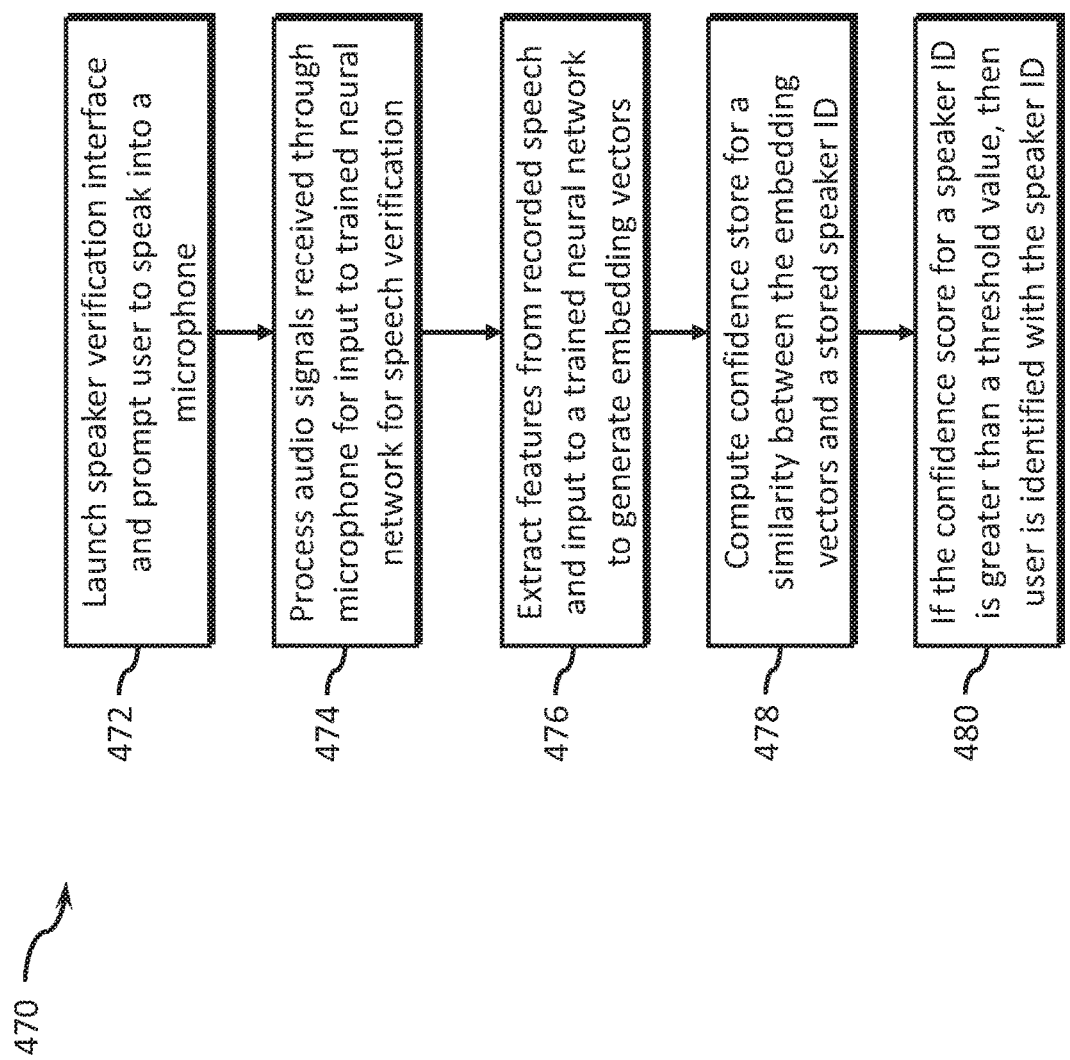
FIG. 4C illustrates an example speaker verification process, in accordance with one or more embodiments of the present disclosure.

Referring to FIG. 4C, an example process 470 for verifying a speaker will be described, in accordance with in or more embodiments. A speaker identification determine may be made, for example, by launching a speaker verification interface and prompting the user to speak into one or more microphones (Step 472). In step 474, the audio signals received from the microphones are processed to suppress noise, cancel echo, identify speech segments, enhance a speech target, and/or otherwise prepare the audio signal for input to a neural network trained for speech verification. In step 476, the system extracts features from recorded speech segments and inputs the features to a trained neural network to generate embedding vectors. In step 478, the system computes a confidence score for one or more stored speaker ID centroids and the user embedding vectors, and in step 480, compares the confidence score with a threshold to decide whether the speaker belongs to a specific ID. For example, if the confidence score for a speaker ID is greater than a predetermined threshold value, then the user may be identified as the speaker having the particular speaker ID.

Figure 5:
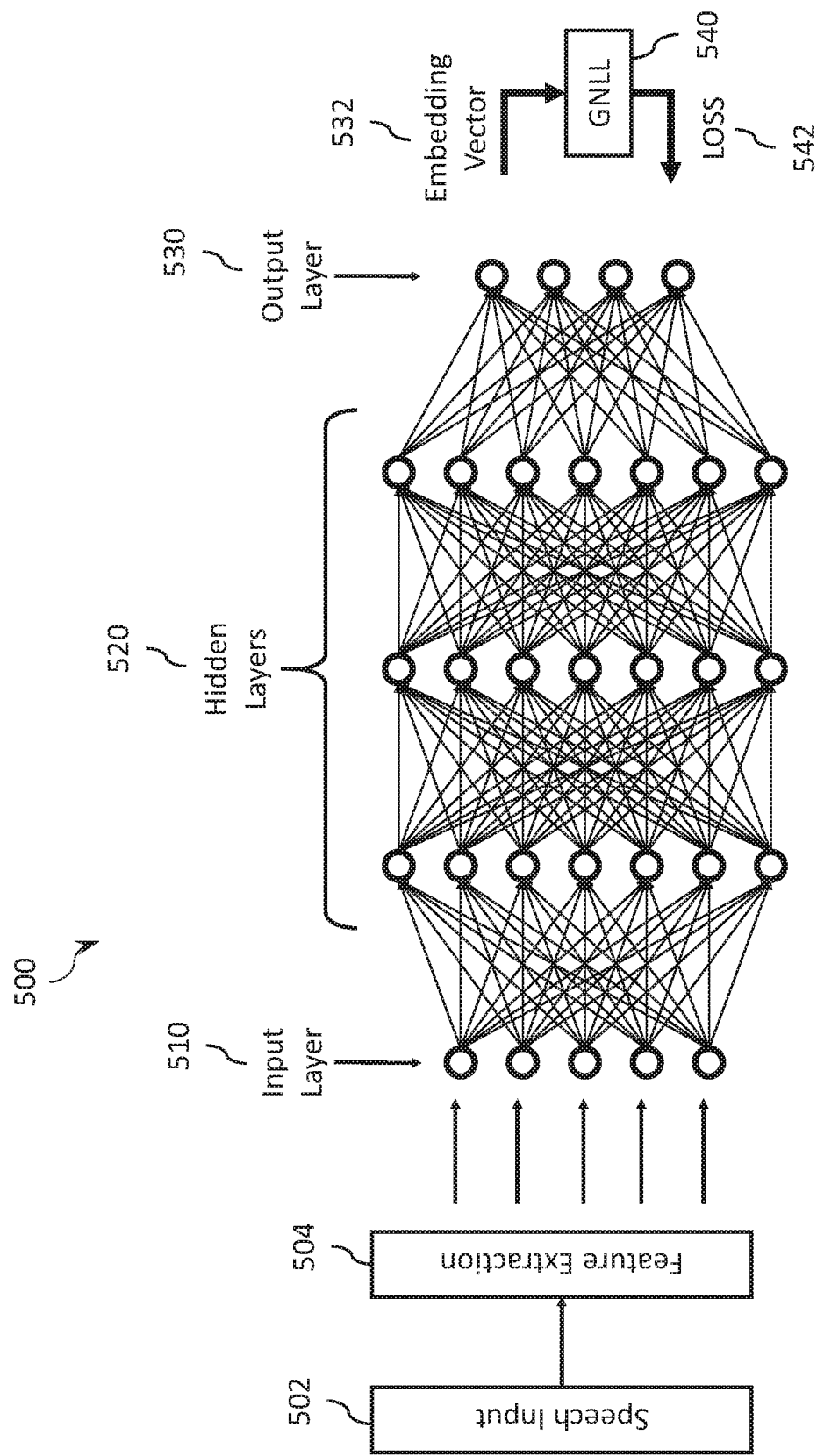
FIG. 5 illustrates an example neural network, in accordance with one or more embodiments of the present disclosure.

Referring to FIG. 5, an example a neural network and training process that may be used to generate trained artificial intelligence training models for use in speaker identification will now be described, in accordance with one or more embodiments. The neural network 500 may be implemented as any neural network configured to receive the input data samples and generate corresponding embedding vectors as taught herein, such as a recurrent neural network, a convolutional neural network (CNN), etc.

The neural network 500 is trained using a supervised learning process that compares input data to a ground truth (e.g., expected network output). For a speaker verification system, the training dataset 502 may include sample speech input (e.g., an audio sample) labeled with a corresponding speaker ID. As described herein, the speech input comprises a batch of speech samples, such as plurality of speech samples for each of a plurality of speakers, that is provided to a feature extraction process 504 to generate a batch of features for input to the neural network 500. The input batch is compared against the output of the neural network 500, and differences between the generated output data and the ground truth output data are fed back into neural network 500 to make corrections to the various trainable weights and biases. As illustrated, the output of the neural network 500 comprises embedding vectors 532 and a loss is calculated using a GNLL process 540, as described herein. The loss 542 is fed back into the neural network 500 using a backpropagation technique (e.g., using a stochastic gradient descent algorithm or similar algorithm). In some examples, training data combinations may be presented to the neural network 500 multiple times until the overall GNLL loss function converges to an acceptable level.

In some examples, each of input layer 510, hidden layers 520, and/or output layer 530 include one or more neurons, with each neuron applying a combination (e.g., a weighted sum using a trainable weighting matrix W) of its inputs x, adding an optional trainable bias b, and applying an activation function $f$ to generate an output a as shown in the equation $a=f(Wx+b)$. In some examples, the activation function $f$ may be a linear activation function, an activation function with upper and/or lower limits, a log-sigmoid function, a hyperbolic tangent function, a rectified linear unit function, and/or the like. In some examples, each of the neurons may have a same or a different activation function.

After training, the neural network 500 may be implemented in a run time environment of a remote device to receive speech utterances and generate associated embedding vectors for comparison against a centroid vector. It should be understood that the architecture of neural network 500 is representative only and that other architectures are possible, including a neural network with only one or several hidden layers, a neural network with different numbers of neuron per layer, a neural network with different kind of hidden layer such as convolutional layer and attention layer, and/or the like.

In other embodiments, the training dataset may include captured sensor data associated with one or more types of sensors, such as speech utterances, visible light images, fingerprint data, and/or other types of biometric information. The training dataset may include images of a user's face for a face identification system, fingerprint images for a finger print identification system, retina images for a retina identification system, and/or datasets for training another type of biometric identification system.

Figure 6:
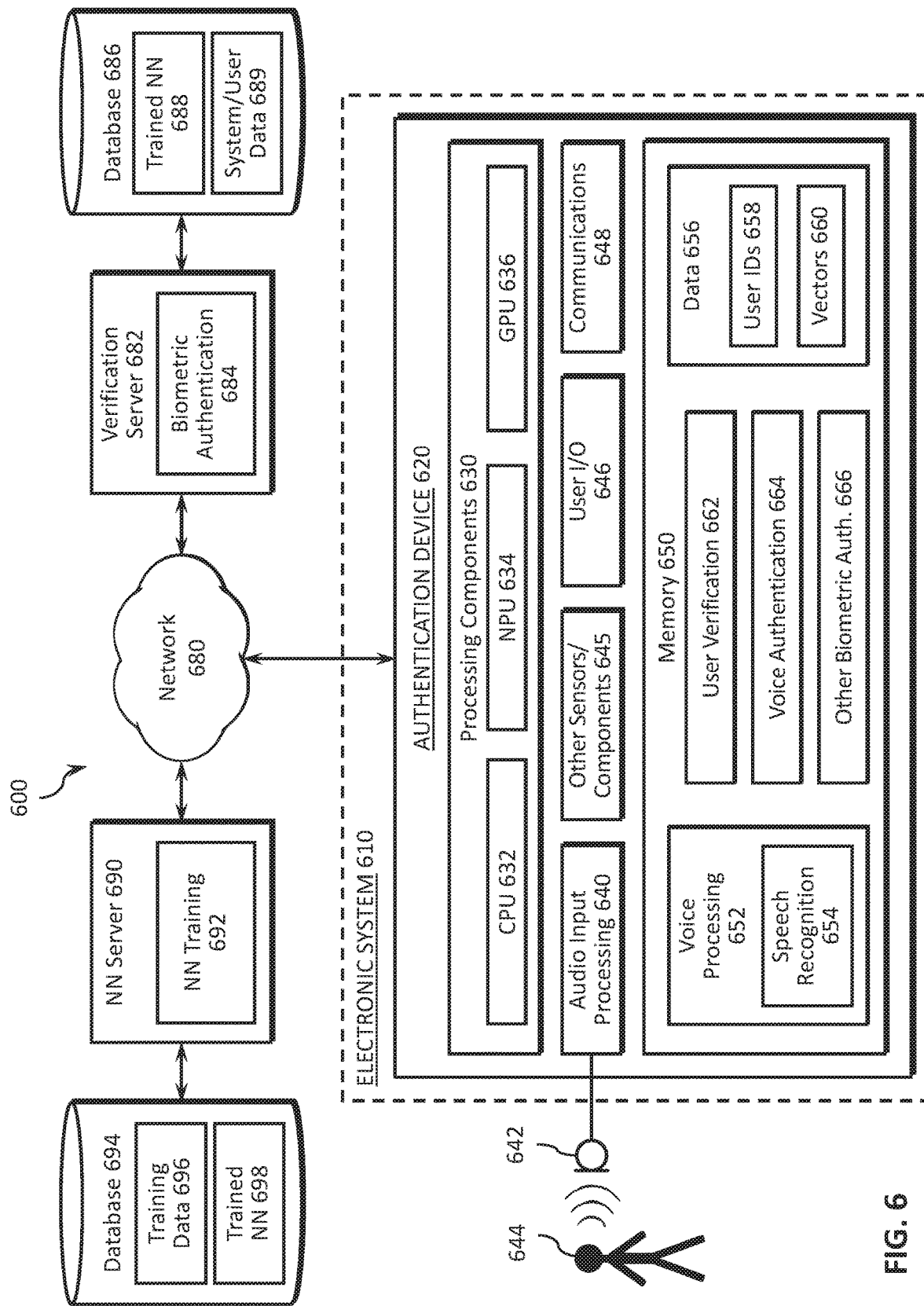
FIG. 6 illustrates and example voice biometric system, in accordance with one or more embodiments of the present disclosure.

FIG. 6 illustrates an example system 600 configured to implement a generalized negative log-likelihood loss for speaker verification, in accordance with one or more embodiment of the present disclosure. Not all of the depicted components in the example system 600 may be required, however, and one or more embodiments may include additional components not shown in the figure. Variations in the arrangement and type of the components may be made without departing from the scope of the disclosure, including additional components, different components, and/or fewer components.

The system 600 includes an authentication device 620 including processing components 630, audio input processing components 640, user input/output components 646, communications components 648, and a memory 650. In some embodiments, other sensors and components 645 may be included to facilitate additional biometric authentication modalities, such as fingerprint recognition, facial recognition, iris recognition, etc. Various components of authentication device 620 may interface and communicate through a bus or other electronic communications interface.

The authentication device 620, for example, may be implemented on a general-purpose computing device, as a system on a chip, integrated circuit, or other processing system and may be configured to operate as part of an electronic system 610. In some embodiments, the electronic system 610 may be, or may be coupled to, a mobile phone, a tablet, a laptop computer, a desktop computer, an automobile, a personal digital assistant (PDA), a television, a voice interactive device (e.g., a smart speaker, conference speaker system, etc.), a network or system access point, and/or other system of device configured to receive user voice input for authentication and/or identification.

The processing components 630 may include one or more of a processor, a controller, a logic device, a microprocessor, a single-core processor, a multi-core processor, a microcontroller, a programmable logic device (PLD) (e.g., field programmable gate array (FPGA)), a digital signal processing (DSP) device, an application specific integrated circuit, or other device(s) that may be configured by hardwiring, executing software instructions, or a combination of both, to perform various operations discussed herein for audio source enhancement. In the illustrated embodiment, the processing components 630 include a central processing unit (CPU) 632, a neural processing unit (NPU) 634 configured to implement logic for executing machine learning algorithms, and/or a graphics processing unit (GPU) 636. The processing components 630 are configured to execute instructions stored in the memory 650 and/or other memory components. The processing components 630 may perform operations of the authentication device 620 and/or electronic system 610, including one or more of the processes and/or computations disclosed herein in FIGS. 1-5.

The memory 650 may be implemented as one or more memory devices or components configured to store data, including audio data, user data, trained neural networks, authentication data, and program instructions. The memory 650 may include one or more types of memory devices including volatile and non-volatile memory devices, such as random-access memory (RAM), read-only memory (ROM), electrically-erasable programmable read-only memory (EE-PROM), flash memory, hard disk drive, and/or other types of memory.

Audio input processing components 640 include circuits and digital logic components for receiving an audio input signal, such as speech from one or more users 644 that is sensed by an audio sensor, such as one or more microphones 642. In various embodiments, the audio input processing components 640 are configured to process a multi-channel input audio stream received from a plurality of microphones, such as a microphone array, and generate an enhanced target audio signal comprising speech from the user 644.

Communications components 648 are configured to facilitate communication between the authentication device 620 and the electronic system 610 and/or one or more networks and external devices. For example, the communications components 648 may enable Wi-Fi (e.g., IEEE 802.11) or Bluetooth connections between the electronic system 610 and one or more local devices or enable connections to a wireless router to provide network access to an external computing system via a network 680. In various embodiments, the communications components 648 may include wired and/or other wireless communications components for facilitating direct or indirect communications between the authentication device 620 and/or other devices and components.

The authentication device 620 may further include other sensor and components 645, depending on a particular implementation. The other sensor components 645 may include other biometric input sensors (e.g., fingerprint sensors, retina scanners, video or image capture for face recognition, etc.), and the user input/output components 646 may include I/O components such as a touchscreen, a touchpad display, a keypad, one or more buttons, dials, or knobs, loudspeaker and/or other components operable to enable a user to interact with the electronic system 610.

The memory 650 includes program logic and data configured to facilitate speaker verification in accordance with one or more embodiments disclosed herein, and/or perform other functions of the authentication device 620 and/or electronic system 610. The memory 650 includes program logic for instructing processing components 630 to perform voice processing 652, including speech recognition 654, on an audio input signal received through the audio input processing components 640. In various embodiments, the voice processing 652 logic is configured to identify an audio sample comprising one or more spoken utterances for speaker verification processing.

The memory 650 further includes program logic for implementing user verification controls 662, which may include security protocols for verifying a user 644 (e.g., to validate the user's identity for a secure transaction, to identify access rights to data or programs of the electronic system 610, etc.). In some embodiments, the user verification controls 662 includes program logic for an enrollment and/or registration procedure to identify a user and/or obtain user voice print information, which may include a unique user identifier and one or more embedding vectors. The memory 650 may further include program logic for instructing the processing components 630 to perform a voice authentication process 664 as described herein with respect to FIGS. 1-5, which may include neural networks trained for speaker verification using generalized negative log-likelihood loss processes, feature extraction components for extracting features from an input audio sample, processes for identifying embedding vectors and generating centroid or other vectors and confidence scores for use in speaker identification.

The memory 650 may further include other biometric authentication processes 666, which may include facial recognition, fingerprint identification, retina scanning, and/or other biometric processing for a particular implementation. The other biometric authentication processes 666 may include feature extraction processes, on or more neural networks, statistical analysis modules, and/or other processes. In some embodiments, the user verification controls 662 may process confidence scores or other information from the voice authentication process 664 and/or one or more other biometric authentication processes 666 to generate the speaker identification determination. In some embodiments, the other biometric authentication processes 666 include a neural network trained through a process using a batch of biometric input data and a GNLL function as described herein.

The memory 650 further includes data storage 656 for storing program and other data, including user identifiers 658, and corresponding vectors 660, such as user centroid and/or embedding vectors. In some embodiments, the data includes information for registered users of the system, which may be acquired, for example, during an enrollment or registration process, during used of the system, or other process where speech from a known speaker is received by a microphone. Each audio sample is associated with a corresponding speaker identifier to link the speaker to a user profile or other user information maintained by the system.

In various embodiments, the authentication device 620 may operate in communication with one or more servers across a network 680. For example, a neural network server 690 includes processing components and program logic configured to train neural networks (e.g., neural network training module 692), for use in speaker verification as described in FIGS. 1-5 herein. In some embodiments, a database 694 stores training data 696, including training datasets and validation datasets for used in training one or more neural network models. Trained neural networks 698 may also be stored in the database 694 for downloading to one or more runtime environments, for use in the voice authentication processes 664. The trained neural networks 698 may also be provided to the one or more verification servers 682, which provide cloud or other networked speaker identification services. For example, the verification server 682 may receive biometric data from an authentication device 620, such as voice data or other biometric data, and upload data to the verification server 682 for further processing. The uploaded data may include a received audio sample, extracted features, embedding vectors, and/or other data. The verification server 682, through a biometric authentication process 684 that includes one or more neural networks (e.g., trained neural network 688 stored in a database 686) trained in accordance with the present disclosure, and system and/or user data 689 to compare the sample against known authentication factors and/or user identifiers to determine whether the user 644 has been verified. In various embodiments, the verification server 682 may be implemented to provide authentication for a financial service or transaction, access to a cloud or other online system, cloud or network authentication services for used with an electronic system 610, etc.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   receiving a training batch of audio samples comprising a plurality of utterances for each of a plurality of speakers;
   extracting features from the audio samples to generate a batch of features;
   processing the batch of features using a neural network to generate a plurality of embedding vectors configured to differentiate audio samples by speaker;
   computing a generalized negative log-likelihood loss (GNLL) value for the training batch based, at least in part, on the embedding vectors; and
   modifying weights of the neural network to reduce the GNLL value.

2. The method of claim 1, wherein computing the GNLL value further comprises generating a centroid vector for each of a plurality of speakers, based at least in part on the embedding vectors.

3. The method of claim 1, wherein modifying weights of the neural network to reduce the GNLL value comprises optimizing the neural network using backpropagation.

4. The method of claim 1, wherein the training batch of audio samples comprises a first number of speakers and a second number of audio samples per speaker.

5. The method of claim 1, further comprising an enrollment process comprising:
receiving an enrollment audio signal comprising speech associated with a known user;
identifying speech segments in the enrollment audio signal;
extracting user features from the speech segments;
inputting the extracted user features to the neural network to generate a plurality of user embedding vectors; and
storing a centroid vector computed from the user embedding vectors and a user identifier.

6. The method of claim 1, further comprising a speaker authentication process comprising:
receiving a target audio signal comprising speech from a target speaker;
extracting target features from the target audio signal;
processing the target features through the neural network to generate at least one target embedding vector; and
determining whether the target speaker is associated with a user identifier by comparing the target embedding vector with a stored centroid vector associated with the user identifier.

7. The method of claim 6, wherein determining whether the target speaker is associated with a user identifier comprises calculating a confidence score measuring a similarity between the target embedding vector and the stored centroid vector.

8. The method of claim 7, wherein calculating the confidence score comprises computing an inner product of the target embedding vector and the stored centroid vector and applying a sigmoid function.

9. The method of claim 6, wherein determining whether the target speaker is associated with a user identifier further comprises:
storing a plurality of user identifiers and corresponding centroid vectors, wherein each of the plurality of user identifiers is associated with a different speaker; and
calculating a confidence score for each of the plurality of user identifiers, based in part on a likelihood that the target embedding vector is from the same speaker as the corresponding centroid vector.

10. The method of claim 9, wherein calculating a confidence score comprises calculating a total loss for each batch of data by computing a centroid using the samples for a speaker.

11. The method of claim 1, further comprising incorporating an additional margin into the embedding vectors, the additional margin configured to separate embedding of speaker classes in the embedding vectors.

12. The method of claim 11, wherein the embedding vectors comprise unit vectors with the additional margin.

13. A system comprising:
a logic device configured to train a neural network using a generalized negative log-likelihood loss (GNLL) function, the logic device configured to execute logic comprising:
receiving a training batch of audio samples comprising a plurality of utterances for each of a plurality of speakers;
extracting features from the audio samples to generate a batch of features;
processing the batch of features using a neural network to generate embedding vectors configured to differentiate audio samples by speaker;
computing a generalized negative log-likelihood loss (GNLL) value for the training batch based, at least in part, on the embedding vectors; and
modifying weights of the neural network to reduce the GNLL value.

14. The system of claim 13, wherein computing the GNLL value further comprises generating a centroid vector for each of a plurality of speakers, based at least in part on the embedding vectors.

15. The system of claim 13, wherein modifying weights of the neural network to reduce the GNLL value comprises optimizing the neural network using backpropagation.

16. The system of claim 13, wherein the training batch of audio samples comprises a first number of speakers and a second number of audio samples per speaker.

17. A system comprising:
a storage component; and
a logic device configured to verify an identity of a speaker by executing logic comprising:
performing an enrollment process comprising:
receiving an enrollment audio signal comprising speech associated with a known user;
identifying speech segments in the enrollment audio signal;
extracting user features from the speech segments;
processing the extracted user features through a neural network, optimized to minimize a generalized negative log-likelihood loss (GNLL) value for an input batch of audio samples, to generate a plurality of user embedding vectors; and
storing a centroid vector computed from the user embedding vectors and a user identifier.

18. The system of claim 17, wherein the logic device is further configured to execute logic comprising:
performing a speaker authentication process comprising:
receiving a target audio signal comprising speech from a target speaker;
extracting target features from the target audio signal;
processing the target features through the neural network to generate at least one target embedding vector; and
determining whether the target speaker is associated with a user identifier by comparing the target embedding vector with a stored centroid vector associated with the user identifier.

19. The system of claim 18, wherein determining whether the target speaker is associated with a user identifier comprises calculating a confidence score measuring a similarity between the target embedding vector and the stored centroid vector by computing an inner product of the target embedding vector and the stored centroid vector and applying a sigmoid function.

20. The system of claim 18, wherein determining whether the target speaker is associated with a user identifier further comprises:
storing a plurality of user identifiers and corresponding centroid vectors, wherein each of the plurality of user identifiers is associated with a unique speaker; and
calculating a confidence score for each of the plurality of user identifiers, based in part on a likelihood that the target embedding vector is from the same speaker as the corresponding centroid vector.

* * * * *